(12) United States Patent
Levin et al.

(10) Patent No.: US 10,565,019 B2
(45) Date of Patent: Feb. 18, 2020

(54) PROCESSING IN A MULTICORE PROCESSOR WITH DIFFERENT CORES HAVING DIFFERENT EXECUTION TIMES

(71) Applicant: Huawei Technologies Co., Ltd., Shenzhen (CN)

(72) Inventors: Mikhail Levin, Moscow (RU); Alexander Filippov, Moscow (RU); Youliang Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 14/752,504

(22) Filed: Jun. 26, 2015

(65) Prior Publication Data
US 2015/0293794 A1 Oct. 15, 2015

Related U.S. Application Data

(63) Continuation of application No. PCT/RU2012/001117, filed on Dec. 26, 2012.

(51) Int. Cl.
*G06F 9/46* (2006.01)
*G06F 9/50* (2006.01)

(52) U.S. Cl.
CPC ............ *G06F 9/5044* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 8,051,412 B2 | 11/2011 | Kasahara et al. | |
| 8,918,770 B2 * | 12/2014 | Ravi | G06F 8/4441 |
| | | | 717/140 |
| 2004/0098718 A1 * | 5/2004 | Yoshii | G06F 9/5033 |
| | | | 718/100 |

(Continued)

FOREIGN PATENT DOCUMENTS

| | | |
|---|---|---|
| CA | 2631255 A1 | 11/2009 |
| EP | 1916601 A2 | 4/2008 |

(Continued)

OTHER PUBLICATIONS

Andersson et al., "Assigning Real-Time Tasks on Heterogeneous Multiprocessors with Two Unrelated Types of Processors," IEEE 31$^{st}$ Real-Time Systems Symposium, pp. 239-248, Institute of Electrical and Electronics Engineers, New York, New York (Nov. 30-Dec. 3, 2010).

(Continued)

*Primary Examiner* — Wissam Rashid
(74) *Attorney, Agent, or Firm* — Leydig, Voit & Mayer, Ltd.

(57) ABSTRACT

The present disclosure relates to a multicore processor. In order to select one of a multiplicity of cores in a multicore processor, an execution time of tasks which are performed multiple times is determined. Based on the determined execution time on the individual cores, an appropriate core for further executions of a task is selected. Additionally, the present disclosure further provides a code generator and code generating method for providing appropriate machine code for a multicore processor.

12 Claims, 5 Drawing Sheets

(56) References Cited

U.S. PATENT DOCUMENTS

| | | | |
|---|---|---|---|
| 2005/0013705 A1* | 1/2005 | Farkas | G06F 9/5044 |
| | | | 417/393 |
| 2006/0123401 A1 | 6/2006 | O'Brien et al. | |
| 2006/0206902 A1 | 9/2006 | Jamil et al. | |
| 2007/0220233 A1 | 9/2007 | Mozak et al. | |
| 2007/0283337 A1 | 12/2007 | Kasahara et al. | |
| 2007/0283358 A1 | 12/2007 | Kasahara et al. | |
| 2009/0282413 A1 | 11/2009 | Cialini et al. | |
| 2010/0156888 A1 | 6/2010 | Luk et al. | |
| 2011/0067029 A1 | 3/2011 | Wolfe et al. | |
| 2014/0165077 A1* | 6/2014 | Martinez Canedo | G06F 8/451 |
| | | | 718/105 |

FOREIGN PATENT DOCUMENTS

| | | | |
|---|---|---|---|
| RU | 2007138014 A | 4/2009 | |
| RU | 2417412 C2 | 4/2011 | |

OTHER PUBLICATIONS

Luk et al., "Qilin: Exploiting parallelism on heterogeneous multiprocessors with adaptive mapping", 42nd Annual IEEE/ACM International Symposium on MicroarchitectureI, XP031597172, Institute of Electrical and Electronics Engineers, New York, New York (Dec. 12-16, 2009).

\* cited by examiner

PROCESSING IN A MULTICORE PROCESSOR WITH DIFFERENT CORES HAVING DIFFERENT EXECUTION TIMES

CROSS-REFERENCE TO RELATED APPLICATIONS

This application is a continuation of International Application No. PCT/RU2012/001117, filed on 26 Dec. 2012, which is hereby incorporated by reference in its entirety.

TECHNICAL FIELD

The present invention relates to a processing method for a multicore processor and a multicore processor, in particular it relates to a multicore processor having a heterogeneous architecture.

BACKGROUND

Multicore systems are widely used in order to speed-up computational operations. Conventional multicore systems usually comprise at least one processor with a plurality of identical cores. By distributing machine code to the individual cores and executing machine code on each of these multiple cores in parallel, parallel computation can be achieved. As long as all of these cores are identical, a supervising instance only has to identify an available core and transfer the respective instructions to this core in order to execute machine code on the core. Since all of these cores are identical, all cores can perform the same machine code, and usually all of these cores will require the same amount of time for completing an operation.

Furthermore, multicore systems having a heterogeneous architecture have become more popular. Such heterogeneous multicore systems may comprise a plurality of cores which may run at different clock rates and/or which may have different instruction sets. Due to such a heterogeneous architecture, a same operation may be finished within a different amount of time depending on the core performing such an operation.

However, since the cores have different instruction sets, an optimum core may depend on the operation to be performed. This means, that for a first operation, a first core could be an appropriate core performing such an operation in a minimum duration. Further, a second core might be a better choice for another, second type of operation. Such operation may be for example a mathematical operation which will be computed very efficiently on an arithmetical core or the operation may be a processing of video data which will be efficiently performed on a graphical core. Hence, to improve computational speed, it is important to choose the optimum core for performing an operation.

Due to the different instruction sets of the individual cores in heterogeneous multicore systems, the machine code for performing an operation has to be adapted to the respective core at the compiling stage when generating machine code for the whole computer program. However, the assignment of a particular core when compiling the code is a big challenge. A very precise knowledge of the executing system is necessary in order to estimate an optimum execution time of the individual cores and to select an appropriate core for each task.

CA 2631255 A describes a task-to-device mapping based on predicted estimation of running time. A running time of a task is estimated for each available device and the task is assigned to the device having the minimal estimated running time.

US 2006/0123401 A describes a method for parallelization of program code. Program code is analysed to determine an optimal strategy for parallelization when compiling the code.

US 2007/0283358 A describes a task-to-device mapping when compiling program code for a heterogeneous multicore system. A compiler estimates a required running time on each device by a static prediction. Based on this prediction an optimum hardware device is selected and machine code is generated for the selected device.

US 2007/0283337 A describes a method for automatically identifying tasks which can be executed in parallel. Based on this analysis, execution time is estimated and the task is assigned to a processing unit.

However, a prediction of an execution time on a particular device requires a complex model describing the properties of the respective device. Furthermore, many models describing the properties of the individual devices are required for each device which should be considered when compiling the program code. For each newly introduced device, a user has to provide input describing the properties of the new device. Nevertheless, estimation of running time will lead to large inaccuracies, and thus it will be very difficult to generate an optimum machine code for heterogeneous multicore systems.

Accordingly, it is an object of the present invention to provide an enhanced assignment of a core in a heterogeneous multicore system.

SUMMARY

According to a first implementation of a first aspect of the disclosure, a processing method for a multicore processor is provided, said multicore processor comprising at least a first core and a second core, the method comprising the steps of receiving machine code for performing a predetermined operation; providing the received machine code to the first core and the second core; processing the machine code on the first core and the second core; determining a first execution time value for the first core and a second execution time value for the second core, the first execution time value specifying an execution time of the machine code on the first core and the second execution time value specifying an execution time of the machine code on the second core; computing a first efficiency factor based on the determined first execution time value and a second efficiency factor based on the determined second execution time value; and processing the machine code on the first core or the second core based on the computed efficiency factors.

In a possible second implementation of the processing method according to the first aspect of the present invention, the method further comprises a step for determining a workload of the first core and the second core.

In a further possible third implementation of the processing method according to the second implementation of the first aspect of the present invention said first efficiency factor is computed based on the determined first execution time value and the determined workload of the first core, and said second efficiency factor is computed based on the determined second execution time value and the determined workload of the second core.

In a possible fourth implementation of the processing method according to the first to the third implementation of the first aspect of the present invention the receiving step receives machine code comprising a first subset relating to a predetermined instruction set of the first core, and a second subset relating to a predetermined instruction set of the second core; wherein the providing step provides the first subset to the first core and provides the second subset to the second core.

In a fifth implementation of the processing method according to the first to the fourth implementation of the first aspect of the present invention the method comprises a step for the determined first execution time value and the determined second execution time value in an execution time memory.

In a sixth implementation of the processing method according to the fifth implementation of the first aspect of the present invention the first efficiency factor and the second efficiency factor are computed based on the stored execution time values.

According to a first implementation of a second aspect of the present invention an instructing method for a multicore processor is provided, the multicore processor comprising at least a first core and a second core, the method comprising the steps of reading pre-stored program code; identifying a subtask in the read program code, said identified subtask being executed multiple times when an operation according to the read program code is performed, and the multiple executions of the identified subtask can be performed simultaneously; generating machine code of said identified subtask, said machine code comprising computer executable instructions for executing said identified subtask on the first core and the second core.

In a possible second implementation of the instructing method according to the second aspect of the present invention the method further comprises a step for determining a number of iterations of said subtask when an operation according to the read program code is performed, wherein said generating step only generates machine code for the first core and the second core if the determined number of iterations is larger than a predetermined threshold value.

In a possible third implementation of the instructing method according to the second aspect of the present invention the identified sub-task is a loop.

According to a third aspect of the present invention, a computer program product is provided which is adapted to perform a processing method according to a first to a sixth implementation of the first aspect of the present invention.

According to a fourth aspect of the present invention, a computer program product is provided which is adapted to perform an instructing method according to a first to a second implementation of the second aspect of the present invention.

According to a fifth aspect of the present invention, a computer-readable storage medium is provided comprising a program product according to the third aspect of the present invention.

According to a sixth aspect of the present invention, a computer-readable storage medium is provided comprising a program product according to the fourth aspect of the present invention.

According to a first implementation of a seventh aspect of the present invention, a multicore processor is provided, the multicore processor comprising a first core adapted to process machine code according to a first instruction set; a second core adapted to process machine code according to a second instruction set; and a scheduler including receiving means adapted to receive machine code for performing a predetermined operation; transfer means adapted to provide the received machine code to the first core and to the second core; processing means adapted to start processing the machine code on the first core and on the second core; determination means adapted to determine a first execution time value specifying an execution time of the machine code on the first core and to determine a second execution time value specifying an execution time of the machine code on the second core; and computing means adapted to compute a first efficiency factor based on the determined first execution time value, and to compute a second efficiency factor based on the determined second execution time value; wherein said processing means starts further processing of the machine code on the first core or on the second core based on the computed first efficiency factor and the computed second efficiency factor.

In a possible second implementation of the multicore processor according to first implementation of the seventh aspect of the present invention the scheduler further comprises workload determination means adapted to determine a first workload of the first core and a second workload of the second core.

In a further possible third implementation of the multicore processor according to the second implementation of the seventh aspect of the present invention said computing means computes the first efficiency factor based on the determined first execution time value and the determined first workload, and computes the second efficiency factor based on the determined second execution time value and the determined second workload.

In a possible fourth implementation of the multicore processor according to the first to the third implementation of the seventh aspect of the present invention the received machine code comprises a first subset relating to the predetermined first instruction set, and a second subset relating to the predetermined second instruction set; wherein the transfer means provides only the first subset to the first core, and provides only the second subset to the second core.

In a possible fifth implementation of the multicore processor according to the first to the fourth implementation of the seventh aspect of the present invention the processor further comprises an execution time memory for storing the determined first execution time value and the determined second execution time value.

In a further possible sixth implementation of the multicore processor according to the first to the fifth implementation of the seventh aspect of the present invention, the processor comprises a first processing unit and a second processing unit, and wherein the first core being arranged in the first processing unit and the second core being arranged in the second processing unit.

According to a first implementation of an eighth aspect of the present invention, an instruction generator for a multicore processor is provided, the multicore processor comprising at least a first core and a second core, the generator comprising code receiving means adapted to receive pre-stored program code; analyzing means adapted to identify a subtask in the read program code, said identified subtask being executed multiple times when an operation according to the read program code is performed, and the multiple execution of the identified subtask can be performed simultaneously; compiling means adapted to generate machine code of said identified subtask, said machine code comprising computer executable instructions for executing said identified subtask on a first core having a first instruction set, and said machine code comprising computer executable instructions for executing said identified subtask on a second core having a second instruction set.

In a possible second implementation of the instruction generator according to the eighth aspect of the present invention the generator further comprises an execution estimation means adapted to determine a number of iterations of said subtask when an operation according to the read program code is performed, wherein said compiling means only generates machine code for a first core and machine code for a second core if the determined number of iterations is larger than a predetermined threshold value.

BRIEF DESCRIPTION OF THE DRAWINGS

In the following, embodiments of the invention will be described by way of example only, with reference to the accompanying drawings in which.

DETAILED DESCRIPTION OF EMBODIMENTS

Figure 1:
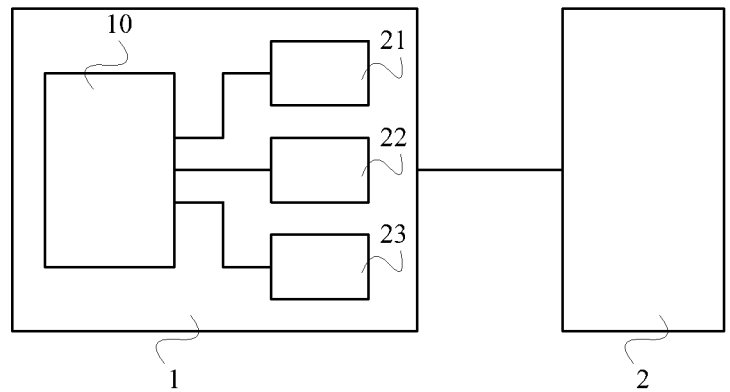
FIG. 1 shows a multicore processor according to a possible implementation of the processor according to the present invention.

FIG. 1 schematically illustrates a multicore processor 1 according to a possible implementation of the seventh aspect of the present invention. The multicore processor 1 comprises at least a scheduler 10 and a plurality of cores 21, 22 and 23. The multicore processor 1 is provided with data stored in memory 2. The data comprises machine code specifying computer executable instructions for performing predetermined operations. The scheduler 10 receives the data with the machine code. Based on these instructions, scheduler 10 generates a list of tasks to be performed according to the received instructions. For each task to be performed, scheduler 10 selects one of the cores 21, 22 or 23. When the task has to be performed, scheduler 10 sends the received machine code to the selected core 21, 22 or 23 and starts the execution of the machine code on the respective core 21, 22 or 23. In this way, a plurality of tasks can be performed in parallel by executing machine code on each of the cores 21, 22 and 23 at the same time.

If all cores 21, 22 and 23 are identical and operated with the same clock rate, a task will require the same operation time period on each of the cores 21, 22 and 23. Thus, scheduler 10 does not have to care about the properties of the individual cores 21, 22 and 23 and selects the next core providing computational resources for performing a task.

However, in multicore systems with a heterogeneous architecture, not all cores 21, 22 and 23 are identical and are operated with the same clock rate. Hence, performing a particular operation on each of these different cores may require a different duration for completing a particular operation. For example, a multicore system comprises a central processing unit (CPU) having a plurality of identical cores for performing standard operations, a graphical processing unit (GPU) for performing graphical operations and a mathematical processing unit (MPU) for performing mathematical operations. The GPU may comprise one or more cores for performing graphical operations very efficiently. However, the cores of such a GPU may by inefficient when completing other operations which do not relate to graphical issues. In the same way, the mathematical processing unit comprises one or more cores for performing mathematical operations, for instance floating point operations. When dealing with such multicore systems comprising a plurality of different types of cores which are optimized for specialized operations, it is very important to select an appropriate type of core for each task to be performed. For this purpose, the scheduler 10 has to know, which core 21, 22 or 23 might be appropriate for performing a particular task in minimum operation time.

In particular, when a task has to be executed multiple times, selection of an optimum core will reduce the required time for completing all these operations significantly.

Figure 2:
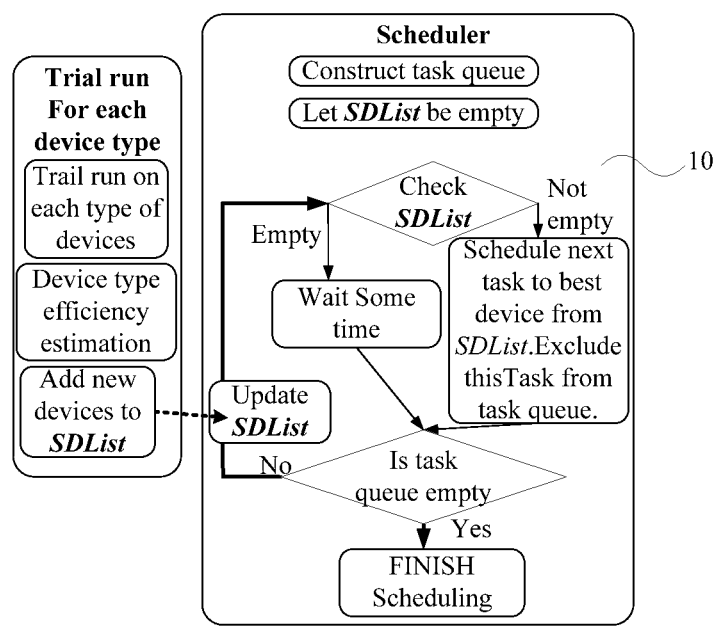
FIG. 2 shows a diagram for illustrating an operation of a scheduler as used by a possible implementation of a processor according to the present invention.

FIG. 2 shows a diagram illustrating an operation of scheduler 10 controlling an execution of parallelized tasks. After scheduler 10 has received machine code including instructions for parallelized tasks, the scheduler 10 constructs a task queue comprising all tasks to be executed. Subsequently, scheduler 10 has to assign each task included in the task queue to one of the plurality of cores 21, 22, 23. For this purpose, a device list SDList of available cores is created for specifying the performance of a core with respect to the current tasks. When starting a new assignment of tasks to the plurality of cores, the device list SDList is empty.

In order to determine the performance of the individual cores 21, 22, 23 with respect to the tasks included in the current task list, a test run of a task is executed for each type of the cores 21, 22, 23, and the elapsed time for completing the task on each cores 21, 22, 23 is determined. To improve the accuracy of the elapsed time for completing a task, a predetermined number NTrials of tasks can be executed and an average value $T_A(C_i)$ of the elapsed time is computed according to the following formula:

$$T_A(C_i) = \frac{T(C_i)}{NTrials}$$

wherein $T(C_i)$ is the total elapsed time for completing the predetermined number NTrials of tasks which are executed on a core $C_i$ of a core type i.

In addition to the required time for completing a predetermined operation, it is also important to consider the workload of the cores 21, 22 and 23. For example, when a huge number of tasks is assigned to a first core being the fastest core, an additional task has to wait until all previous scheduled operations have been completed before the additional task can be executed. Hence, the additional task can be completed even earlier, if the task is executed by another core having a smaller workload.

It is for this purpose, that scheduler 10 further considers the workload of the individual cores 21, 22 and 23 when performing a test run. Accordingly, an efficiency factor Eff(i) can be computed:

$$Eff(i) = \frac{1}{(1 - L(C_i)) \cdot T_A(C_i)}$$

wherein $T_A(C_i)$ is the time for completing above-described test task on core $C_i$ of a core type i. $L(C_i)$ describes the workload of core $C_i$ when the test run is started, wherein $L(C_i)$ is a real value between 0 (idle) and 1 (fully loaded). Thus, by considering the current workload, a normalization of the efficiency factor is computed and an appropriate efficiency of a core can be determined, even when the respective core is highly loaded at the moment when a test run starts.

The information relating to the workload is usually provided by the operating system. In this way, an efficiency factor Eff(i) can be computed for each of the available cores 21, 22, 23. After an efficiency factor of a core 21, 22, 23 is computed, an additional entry in the device list SDList is created, as illustrated in the left part of FIG. 2.

The multicore processing system may comprises a plurality of cores relating to a same core type. For instance, the multicore processing system may comprise a plurality of processing units, like a CPU, a MPU and/or a GPU. Each processing unit may further comprise a plurality of cores relating to the same core type.

If a plurality of cores relating to the same core type are available in the multicore processing system, it is sufficient to perform only a test run on a single representative core of each core type. After a test run on the representative core of a core type has been completed and the corresponding efficiency factor has been computed, a separate entry for each available core relating to this core type is created in the device list SDList.

If at least one entry is created in the device list SDList, scheduler 10 schedules the remaining tasks included in the task queue. For this purpose, a further task is assigned to a core C satisfying the following conditions:
the efficiency factor Eff(Type(C)) of the respective type of core C is already computed;
the core is not fully loaded, i.e. the workload L(C) of core C is less than 1; and
the estimated time T(C) for completing the task being the minimum according to the following formula:

$$T(C) = \frac{1}{(1 - L(C)) \cdot Eff(Type(C))}$$

After a task is assigned to a core, the task is removed from the task queue. The remaining tasks are scheduled in the same way as described above.

When dealing with multicore systems having a heterogeneous architecture, the individual cores do not only provide a specialization for particular operations. Moreover, such specialized cores for particular operations like floating point arithmetical operations or special graphic computations usually have specialized instruction sets. Such specialized, different instruction sets require separate machine code for each type of core, wherein the machine code is adapted to the particular instruction set of the respective core. Hence, an individual machine code has to be provided for each type of core.

Since the assignment of a task to a particular core is determined at the runtime of the code, the data provided to the multicore processor 1 have to comprise machine code for all available cores 21, 22, 23. In more detail, the code provided to multicore processor 1 comprises multiple versions of a task, each version being machine code with respect to the instruction set of one of the plurality of cores. In this way, multiple versions of task are available and the scheduler 10 can provide all cores 21, 22 and 23 with the respective versions of the machine code for performing such a task. In this way, it is not necessary to determine a particular core in advance when generating the machine code at a previous compiling stage.

Based on the multiple machine code versions of a task, scheduler 10 is able to provide all cores 21, 22 and 23 with an appropriate machine code version. In particular, when starting a test run of a task for determining a required processing time on each of the multiple cores 21, 22, 23, each core can be provided with an adequate version of machine code with respect to individual instruction sets of the cores 21, 22, 23.

Since the machine code is available for all different types of cores included in the multicore processor 1, scheduler 10 can select an appropriate core 21, 22 or 23 based on the actual properties of the system, in particular based on the workload of the individual cores 21, 22, 23 and the determined duration for executing the task.

When dealing with a multicore processor having a heterogeneous structure, some of the cores are based on the same device type. For example, the multicore processor may comprise a first processing unit, for example a CPU, having a plurality of identical cores of a first core type, and a second processing unit, for example a GPU, having a plurality of cores of a second core type. Accordingly, it can be assumed that a task will be executed within the same time on each core relating to the same type of core. Hence, it is sufficient to run only a single test task on one of the cores relating to the same device type.

Figure 3:
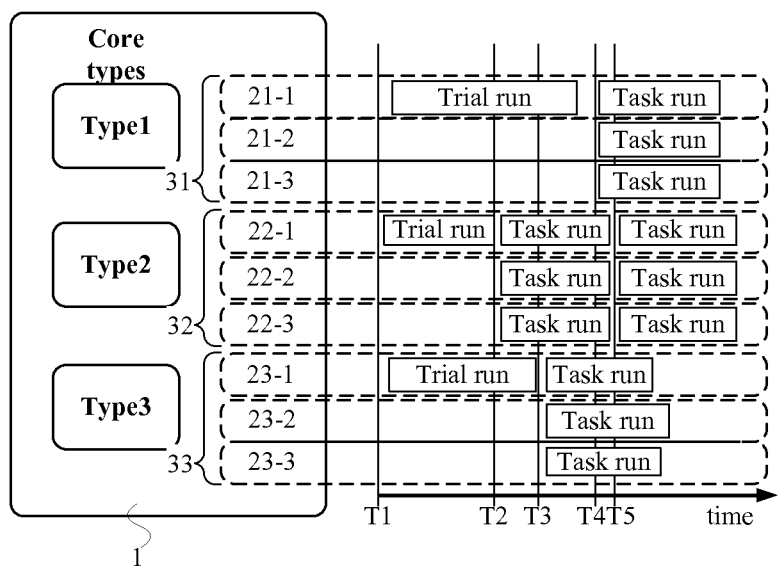
FIG. 3 shows a diagram illustrating the operation of a multicore processor as used by an implementation according to a seventh aspect of the present invention.

FIG. 3 illustrates a diagram of a multicore processor having three processing units 31, 32, 33. Each processing unit 31, 32, 33 may comprise a plurality of cores of a different device type, respectively. For example, core 21-1, 21-2 and 21-3 in the first processing unit 31 relate to a first device type. Core 22-1, 22-2 and 22-3 in the second processing unit 32 relate to a second device type. Core 23-1, 23-2 and 23-3 in the third processing unit 33 relate to a third device type.

When a new set of tasks has to be scheduled, a single test run is executed for each device type. According to FIG. 3, a test run is performed on core 21-1 for a first device type, on core 22-1 for a second device type and on core 23-1 for a third device type. All test runs are started at T1.

After the test run has been completed on core 22-2 at T2, an efficiency factor is computed for the second device type, and further tasks are started on each core 22-1, 22-2 and 22-3 relating to the second device type.

Next, the test run is completed on core 23-1 at T3, and an efficiency factor is computed for the third device type. Accordingly, the scheduler can choose between cores of the second and the third device type. Since the cores 22-1, 22-1 and 22-3 of the second device type are fully loaded, the next three tasks are assigned to cores 23-1, 23-2 and 23-3 of the third device type.

Finally, the test run is also completed on core 21-1 at T4. Accordingly, an efficiency factor is computed for the first device type, and the scheduler can choose between cores of the first, the second and the third device type. However, all cores of the second and the third device type are fully loaded. Hence, further tasks are assigned to core 21-1, 21-2 and 21-3 relating to the first device type.

When cores 22-1, 22-2 and 22-3 have completed their tasks at T5, the scheduler can choose between cores of the first, the second and the third device type. Since all cores of the first and the third device type are fully loaded, further tasks are assigned to the cores 22-1, 22-2, 22-3 of the second device type.

Figure 4:
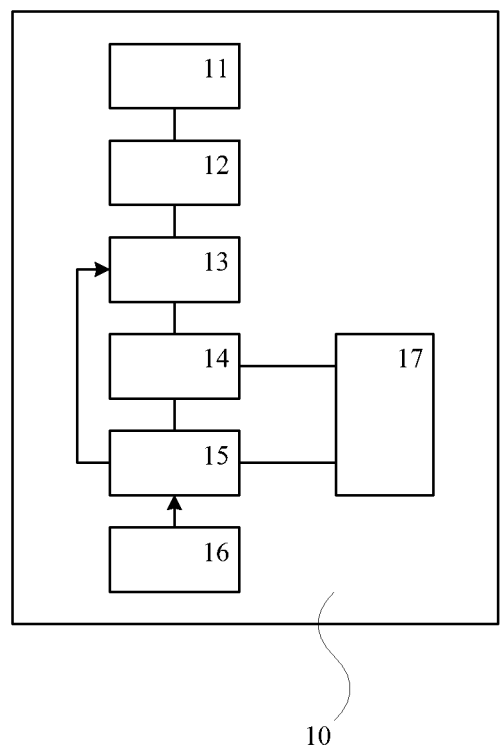
FIG. 4 shows a scheduler as used in a possible implementation of a first aspect of the present invention.

FIG. 4 shows a scheduler 10 of a possible implementation of a multicore processor according to a seventh aspect of the invention. The scheduler 10 includes a receiving means 11. The receiving means 11 receives machine code for performing a predetermined operation. This machine code is included in the data provided to the multicore processor 1.

Further, the scheduler 10 includes a transfer means 12. This transfer means 12 provides received machine code to each of the plurality of cores 21, 22 and 23. After the machine code is transferred to the respective core, processing means 13 starts processing of the machine code at the respective core. In order to execute a test run for determining an execution time on each of the available cores 21, 22 and 23, the machine code is transferred to each of the cores 21, 22, 23, and processing means 13 starts the processing of the machine code on each of the plurality of cores 21, 22, 23.

Next, determination means 14 determines an duration of the execution for each of the plurality cores 21, 22, 23. For this purpose, an execution time value specifying a duration of execution of the machine code on the core is determined. Computing means 15 computes an efficiency factor $E_{ff}(i)$ for each core 21, 22, 23 based on the determined execution time value. After the test runs have been completed and the efficiency factors are computed, processing means 13 starts a further processing of machine code on a core 21, 22, 23 based on the computed efficiency factor $E_{ff}(i)$. In this way, an appropriate distribution of the machine code for an minimum execution time can be achieved.

In order to further consider the workload of the individual cores 21, 22 and 23, a workload determination means 16 determines the workload of each of the plurality of cores 21, 22, 23. This determination of the workload can be achieved, for instance, by an operating system supervising the multicore processor 1. However, other possibilities for determining a workload of the multicore processor 1 are also possible. When considering the workload of the individual cores 21, 22 and 23, the efficiency factors $E_{ff}(i)$ may be further computed based on the determined workload of the cores 21, 22, 23 in combination with the determined execution time values.

In particular, when at least two of the cores 21, 22 and 23 have a different instruction set, the received machine code may comprise a plurality of subsets, each subset relating to a predetermined instruction set of one of the cores. Accordingly, receiving means 11 receives a large amount of machine code. Transfer means 12 of scheduler 10 only provides a subset of the appropriate machine code to each of the cores 21, 22, 23. In other words, only machine code corresponding to the instruction set of core 21, 22, 23 is transferred to the respective core 21, 22, 23.

Additionally, scheduler 10 further may comprise an execution time memory 17 for storing the determined execution time values. For example, the execution time values may be stored in a table specifying the execution time for each of the cores 21, 22 and 23. In this way, the execution time values are available at any time for a further determination of an appropriate core and for computing an efficiency factor.

Figure 5:
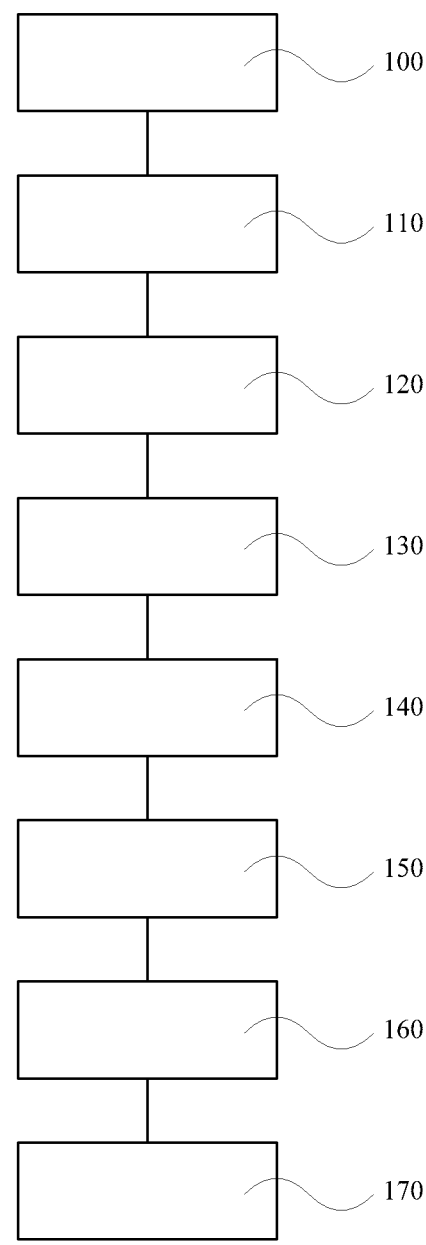
FIG. 5 shows a flow diagram of a processing method according to a possible implementation of a first aspect of the invention.

FIG. 5 illustrates a flowchart of a processing method for a multicore processor 1 according to a possible implementation of a first aspect of the present invention. In a first step 100, machine code for performing a predetermined operation is received. In order to further consider the workload of the individual cores 21, 22 and 23, the workload may be determined in step 110. As it has been already outlined above, the determination of the workload can be performed, for instance, by an operation system supervising the whole multicore system 1 or by any further method for obtaining the workload of the respective cores 21, 22 and 23.

In order to run a test operation on each of the cores 21, 22 and 23, in a further step 120 the received machine code is provided to a plurality of cores of different types of core. Next, in step 130 the machine code is processed on each of the plurality of cores. After the processing of the machine code has been completed, in step 140, an execution time value for each of the plurality of cores is determined. For this purpose, a time duration is measured between a start signal and the termination of the core when performing the machine code. Based on the determined execution time value and the workload determined in step 110, in step 150 an efficiency factor for each type of core is computed. After at least one efficiency factor is computed, in step 160 a further processing of the machine code is performed by one of the cores 21, 22, 23. For this purpose, a core for a further processing is selected based on the computed efficiency factors.

The determined efficiency factors may be stored in a table as already outlined above. For this purpose, the determined efficiency factors are stored in step 170 in a memory 17.

If at least two of the cores 21, 22 and 23 have a different instruction set, the received machine code in step 100 comprises appropriate subsets of machine code relating to the individual instruction sets of the cores 21, 22 and 23. Accordingly, providing step 120 only provides the machine code relating to the instruction set of core to the respective core 21, 22 and 23. Hence, each core can be provided with the correct machine code relating to the instruction set of a core.

According to the above-described multicore processor 1 and the corresponding processing method, it is possible to determine at the duration for performing a task on an appropriate core. In particular, when executing the same task multiple times, the execution time for the whole cycle comprising the multiple executions of the task, can be significantly improved by selecting an appropriate core. Since the respective core is determined at the runtime, it is not necessary to perform any estimations at the compiling stage of the machine code.

The efficiency of the real time assignment of cores increases, if a large number of same tasks have to be executed after determining the execution time values and computing the efficiency values. Otherwise, if only a small number of cycles has to be performed after computing the efficiency values, the impact of the real time assignment will be low. In order to avoid unnecessary determinations of execution time values, a further step (not shown) may be introduced, determining how many iterations of the same task have to be executed. To avoid an unnecessary overload, execution time values are only determined if the determined number of iterations exceeds a predetermined threshold value.

However, it has to be emphasized in this context, that the determination of the execution time values do not lead to any unnecessary executions, since the determination of the execution time value is performed based on the provided machine code. Thus, even the results of the test tasks lead to results which are used when performing the program code.

As it has become apparent from the above description, a specialized machine code is needed for performing a real time selection of cores in a heterogeneous multicore processor 1.

Figure 6:
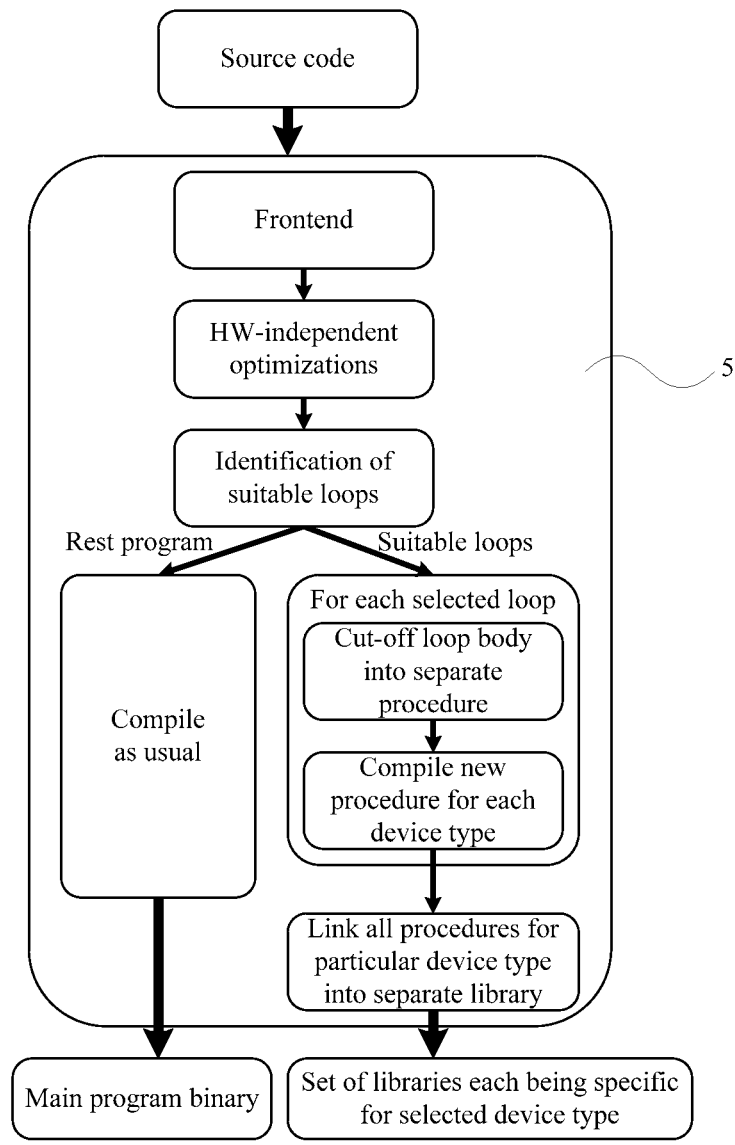
FIG. 6 shows a diagram illustrating the operation of an instruction generator as used in a possible implementation of a generator according to an eighth aspect of the present invention.

FIG. 6 shows a flow chart illustrating the generation of machine code according to an implementation of the second aspect of the invention. Code generator 5 is provided with source code. First, a front end performs a semantic, lexical and syntactical analysis of the provided source code, and outputs an intermediate representation of the code. Next, a hardware-independent optimization is performed. For example, common sub-expressions are eliminated and unused segments of the code are removed. Subsequently, an identification of code segments, which are appropriate for parallelization, is carried out. For example, suitable loops are identified in the code. If possible, the number of loop iterations is determined, and a loop is considered to be suitable for parallelization, when the number of iterations exceeds a predetermined threshold value.

The remaining code, i.e. the code which is considered to be not appropriate for parallelization, is compiled in a conventional manner, as already known in the prior art. Further to this, for each part of the code, which is appropriate for parallelization, the respective code segment, for example the code of a loop, is converted into a separate procedure. Hence, the individual tasks can be executed by calling the respective procedure. Next, the code of the created procedure is compiled for each device type available in the multicore processor 1. Since each device type usually has a different instruction set, separate code has to be generated for each device type. Finally, a separate library of the compiled procedures is created for each device type, and the set of libraries is output in addition to the compiled main program.

Figure 7:
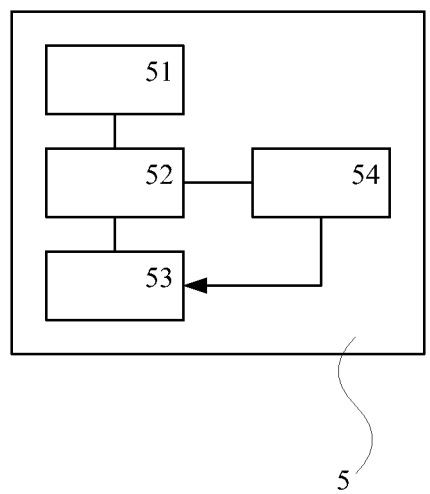
FIG. 7 shows an instruction generator according to a possible implementation of the eighth aspect of the present invention.

FIG. 7 schematically illustrates an instruction generator 5 according to a possible implementation of an eighth aspect of the present invention. The instruction generator 5 comprises a code receiving means 51 which is provided with pre-stored program code. This program code may be stored, for instance, in a program memory. The program code describes a sequence of operations to be performed on the multicore processor 1. For this purpose, a desired operation may be programmed in a commonly known program language, for instance C, C++, or any other computer language.

The received program code is analyzed by analyzing means 52 in order to identify a subtask in the program code. In particular, analyzing means 52 identifies such subtasks, which have to be executed multiple times when performing the pre-stored program code. In order to enable a parallel execution of a subtask, it is important that each execution of the subtask can be performed independently. Such a subtask could be, for instance, a loop in the program code which is executed multiple times.

After identifying a subtask which could be parallelized, an execution estimation means 54 may determine a number of iterations of the subtask. If the number of iterations of the subtask exceeds a predetermined threshold value, such a subtask is considered to be appropriate for a distribution to the cores of a multicore processor 1 as described above. Otherwise, if an expected number of iterations of a subtask is below a predetermined threshold value, the real time analysis for distributing the program code to the cores of the multicore processor is skipped.

However, if the identified subtask is considered to be appropriate for real time analysis and distribution to the cores 21, 2, 23 of a multicore processor 1, compiling means 53 generates a machine code of the identified subtask. The generated machine code comprises computer executable instructions for all related cores 21, 22, 23 with respect to the instruction sets of the considered cores in the heterogeneous multicore system 1. Hence, the generated machine code does not comprise only machine code according to a single instruction set of a single core, but multiple versions of machine code, one version for each instruction set of the plurality of cores. Hence, scheduler 10 can provide all related cores 21, 22, 23 with an appropriate machine code for executing the subtask.

In this way a very flexible machine code version can be generated allowing to select an appropriate core in a heterogeneous multicore processor 1. Accordingly, it is not necessary to determine a particular core when compiling the program code without the knowledge of the properties of the system, for instance, the actual workload.

Figure 8:
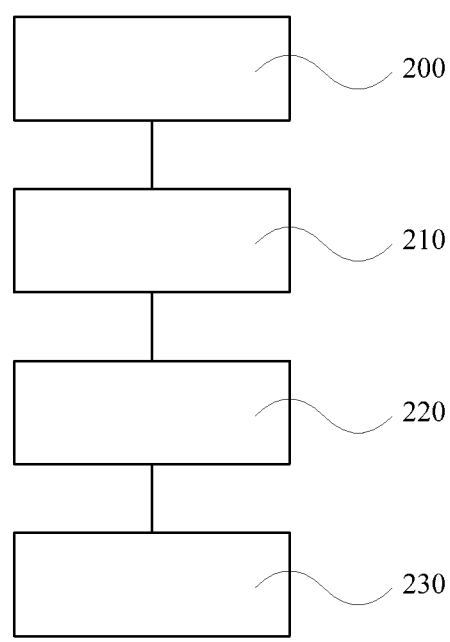
FIG. 8 shows a flow diagram of an instructing method according to a possible implementation of the second aspect of the present invention.

FIG. 8 illustrates a flowchart for performing an instruction method for a multiprocessor according to a possible implementation of a second aspect of the present invention. In a first step 200, pre-stored program code is read. For instance, computer code in an appropriate computer language may be stored in a memory and this code may be read for further processing.

Next, in step 210, a subtask is identified in the program code which has to be executed multiple times. Further, the subtask has to be analyzed in order to identify a subtask which is appropriate for a parallel execution.

In step 220, machine code is generated for the identified subtask. If the subtask is appropriate for a parallel execution, a generated machine code comprises computer-executable instructions for executing the subtask on a plurality of cores having different instruction sets. In other words, multiple versions of machine code are generated, one version for each instruction sets of the considered cores 21, 22 and 23.

In order to enhance the efficiency, a step 230 may be included for estimating the number of iterations of the subtask. In this case, only if the estimated or determined number of iterations of the subtask exceeds a predetermined threshold value, multiple versions of machine code are generated in order to allow the above described real time analysis for selecting the cores in the multicore processor 1. Otherwise, if the identified subtask is repeated less than the predetermined threshold value, only a single machine code version is generated.

Summarizing, the present invention relates to a heterogeneous multicore processor 1. In order to select one of the multiple cores 21, 22, 23 in such a processor, an execution time of tasks which are performed multiple times is determined. Based on the determined execution time on the individual cores 21, 22, 23, an appropriate core 21, 22, 23 for further executions of a task is selected. Additionally, the present invention further provides a code generator and code generating method for providing appropriate machine code for a heterogeneous multicore processor 1.

The invention claimed is:

1. A processing method for a multicore processor, the multicore processor comprising at least a first core and a second core, the method comprising:
 receiving machine code for performing a predetermined operation, wherein the machine code comprises a first subset relating to a predetermined instruction set of the first core, and a second subset relating to a predetermined instruction set of the second core;
providing only the first subset to the first core and providing only the second subset to the second core;
performing test runs on the first core and the second core by processing the subsets on the first core and the second core;
determining a first execution time value for the first core and a second execution time value for the second core, wherein the first execution time value specifies an execution time of the machine code on the first core and the second execution time value specifies an execution time of the machine code on the second core;
determining current workloads of the first and second cores, wherein the current workload of the first core indicates a load level of the first core before processing the machine code, and the current workload of the second core indicates a load level of the second core before processing the machine code;
computing a first efficiency factor based on the determined first execution time value and the determined current workload of the first core;
computing a second efficiency factor based on the determined second execution time value and the determined current workload of the second core; and
processing the machine code on the first core or the second core based on the computed efficiency factors and the determined current workloads.

2. The method according to claim 1, further comprising:
storing the first execution time value and the second execution time value in an execution time memory, wherein the first efficiency factor and the second efficiency factor are computed based on the stored execution time values.

3. A computer program product comprising non-transient computer readable medium storing instructions for causing a multicore processor to perform a method comprising:
receiving machine code for performing a predetermined operation, wherein the machine code comprises a first subset relating to the predetermined first instruction set, and a second subset relating to the predetermined second instruction set;
providing only the first subset to a first core of the multicore processor, and providing only the second subset to a second core of the multicore processor;
performing test runs on the first core and the second core by processing the subsets on the first core and the second core;
determining a first execution time value for the first core and a second execution time value for the second core, wherein the first execution time value specifies an execution time of the machine code on the first core and the second execution time value specifies an execution time of the machine code on the second core;
determining current workloads of the first and second cores, wherein the current workload of the first core indicates a load level of the first core before processing the machine code, and the current workload of the second core indicates a load level of the second core before processing the machine code;
computing a first efficiency factor based on the determined first execution time value and the determined current workload of the first core;
computing a second efficiency factor based on the determined second execution time value and the determined current workload of the second core; and
processing the machine code on the first core or the second core based on the computed efficiency factors and the determined current workloads.

4. A multicore processor comprising:
a first core adapted to process machine code according to a first instruction set;
a second core adapted to process machine code according to a second instruction set; and
a scheduling processor adapted to:
receive machine code for performing a predetermined operation, wherein the machine code comprises a first subset relating to the predetermined first instruction set, and a second subset relating to the predetermined second instruction set,
provide only the first subset to the first core, and provide only the second subset to the second core,
perform test runs on the first core and the second core by processing the subsets on the first core and on the second core,
determine a first execution time value specifying an execution time of the machine code on the first core,
determine a second execution time value specifying an execution time of the machine code on the second core,
determine a current workload of the first core indicating a load level of the first core before processing the machine code,
determine a current workload of the second core indicating a load level of the second core before processing the machine code,
compute a first efficiency factor based on the first execution time value and the determined current workload of the first core,
compute a second efficiency factor based on the second execution time value and the determined current workload of the second core, and
further process the machine code on the first core or on the second core based on the first efficiency factor and the second efficiency factor and the determined current workloads.

5. The multicore processor according to claim 4, further comprising an execution time memory for storing the first execution time value and the second execution time value.

6. The multicore processor according to claim 4, further comprising:
a first processing unit; and
a second processing unit, wherein the first core is arranged in the first processing unit and the second core is arranged in the second processing unit.

7. An instruction generator for a multicore processor, the multicore processor comprising at least a first core and a second core, the instruction generator comprising a scheduling processor configured to:
receive pre-stored program code;
identify a subtask in the pre-stored program code, wherein the identified subtask is executed multiple times when an operation according to the pre-stored program code is performed, and wherein the multiple executions of the identified subtask are performed simultaneously;
generate machine code of the identified subtask, wherein the machine code comprises computer executable instructions for executing the identified subtask on the first core having a first instruction set, and the machine code comprises computer executable instructions for executing said identified subtask on the second core having a second instruction set;

determine current workloads of the first and second cores indicating a load level of each of the first and second cores before processing the machine code of the identified subtask;

compute a first efficiency factor based on an execution time of the machine code on the first core and the determined current workload of the first core;

compute a second efficiency factor based on an execution time of the machine code on the second core and the determined current workload of the second core; and process the machine code on the first core or on the second core based on the first and second efficiency factors and the determined current workloads.

8. The generator according to claim 7, wherein the scheduling processor is further configured to:

determine a number of iterations of the subtask when an operation according to the pre-stored program code is performed; and only generate machine code for the first core and machine code for the second core when the number of iterations is larger than a predetermined threshold value.

9. The method according to claim 1, wherein the first efficiency factor is directly proportional to the current workload of the first core and the second efficiency factor is directly proportional to the current workload of the second core.

10. The computer program product according to claim 3, wherein the first efficiency factor is directly proportional to the current workload of the first core and the second efficiency factor is directly proportional to the current workload of the second core.

11. The multicore processor according to claim 4, wherein the first efficiency factor is directly proportional to the current workload of the first core and the second efficiency factor is directly proportional to the current workload of the second core.

12. The generator according to claim 7, wherein the first efficiency factor is directly proportional to the current workload of the first core and the second efficiency factor is directly proportional to the current workload of the second core.

* * * * *